(12) United States Patent
Bergeron

(10) Patent No.: US 8,841,635 B2
(45) Date of Patent: Sep. 23, 2014

(54) MICROWAVE INDUCED VISIBLE LUMINESCENCE

(75) Inventor: Noah P. Bergeron, Woodford, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 49 days.

(21) Appl. No.: 13/533,200

(22) Filed: Jun. 26, 2012

(65) Prior Publication Data

US 2013/0341529 A1 Dec. 26, 2013

(51) Int. Cl.
G01T 1/00 (2006.01)

(52) U.S. Cl.
CPC ........................ *G01T 1/00* (2013.01)
USPC ...................................................... 250/483.1

(58) Field of Classification Search
CPC .............................................. G01T 1/00
USPC ................................. 250/483.1, 581
See application file for complete search history.

(56) References Cited

U.S. PATENT DOCUMENTS

| | | | | |
|---|---|---|---|---|
| 4,337,648 | A | 7/1982 | Gillespie | 73/117.3 |
| 6,464,392 | B1 | 10/2002 | Carrieri et al. | 374/45 |
| 6,731,804 | B1 | 5/2004 | Carrieri et al. | 382/191 |
| 7,892,519 | B2 | 2/2011 | Pak et al. | 423/511 |
| 8,164,265 | B2 | 4/2012 | Shinogi | 315/39.51 |
| 2007/0176131 | A1* | 8/2007 | Takahashi | 250/581 |
| 2009/0181552 | A1* | 7/2009 | Shimomura et al. | 438/795 |

OTHER PUBLICATIONS

Yang, W. F. et al.: "Temperature-dependent exiton luminescence from an Au-nanopattern-coated ZnCdO film", *EPL*, 99, 2, 27003, (2012). http://iopscience.iop.org/0295-5075/99/2/27003/pdf/0295-5075_99_2_27003.pdf.
Van den Eeckhout, K. et al.: "Persistent Luminescence in Eu2+-Doped Compounds: A Review", Materials 2010, 3, 2536-66 (2010). https://biblio.ugent.be/input/download?func=download File&recordOId=922953&fileOId=922954 https://biblio.urgent.be/publications/922953/file/922954 https://www.mdpi.com/1996-1944/3/4/2536/pdf.
Van den Eeckhout, K.: et al.: "Luminescent Afterglow Behavior in the M2Si5N8: Eu Family (M=Ca, Sr, Ba)", Materials 2011, 4(6), 980-990. http://www.mdpi/1996-1994/4/6/980/pdf.
Smet, P. F. et al.: "Temperature and wavelength dependent trap filling in $M_2Si_5N_8$:Eu (M=Ca, Sr, Ba) persistent phosphors", *J. of Luminescence*, 132 (2012) 682-689 http://users.ugent.be/~pfsmet/papers/A1_52_2012%20PFS%20JLumin.pdf.
Botterman, J. et al.: "Persistent luminescence in $MSi_2O_2N_2$: Eu phosphors", *Optical Materials Express*, 2, 3 (2012), 341-349. http://www.opticsinfobase.org/ome/viewmedia.cfm?url=ome-2-3-341&seq=0.

* cited by examiner

*Primary Examiner* — David Porta
*Assistant Examiner* — Faye Boosalis
(74) *Attorney, Agent, or Firm* — Gerhard W. Thielman, Esq

(57) ABSTRACT

An indicator device for detecting high-power microwave radiation is provided, including an electrically-insulating substrate; an electrically-conductive portion disposed on the substrate; and an electroluminescence material disposed on the portion. The electroluminescence material can be zinc-cadmium-sulfide ((ZnCd)S) crystal doped with manganese (Mn) and aluminum (Al) as $(ZnCd)S:Mn^{2+},Al^{3+}$, zinc sulfide (ZnS) crystal doped with manganese (Mn) as $ZnS:Mn^{2+}$, calcium sulfide (CaS) doped with europium (Eu) as $CaS:Eu^{2+}$, or strontium aluminate $(SrAl_2O_4)$ doped with europium and dysprosium as $(SrAl_2O_4):Eu^{2+},Dy^{3+}$.

8 Claims, 9 Drawing Sheets

| Electron Energy | | 100kV/m Electric Field | | Electron Speed 800 |
|---|---|---|---|---|
| eV | aJ | Distance mm | Eff Accel Voltage V | km/ms |
| 1000 | 160 | 10 | 1000 | 18.7 |
| 500 | 75 | 5 | 500 | 12.8 |
| 100 | 16 | 1 | 100 | 5.9 |
| 10 | 1.6 | 0.1 | 10 | 1.9 |
| 1 | 0.16 | 0.01 | 1 | 0.6 |

Fig. 8

MICROWAVE INDUCED VISIBLE LUMINESCENCE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to conversion of incident microwave radiation to visible light. In particular, the invention uses electroluminescence to receive and detect microwave radiation and in response emit photons in the visible portion of the electromagnetic spectrum Exposure to high-power microwave (HPM) radiation represents a concern for military personnel as a consequence of operational environments. Microwaves, broadly including ultra-high frequency (UHF) and extreme-high frequency (EHF) can be defined as electromagnetic radiation with wavelengths $\lambda$ of approximately between 1 m and 1 mm ($10^{-3}$ m), which correspond to frequencies $v=c/\lambda$ between 0.3 GHz ($10^9$ Hz) and 0.3 THz ($10^{12}$ Hz). This can be alternatively expressed as photon energies $E=\hbar\omega=hv=hc/\lambda$ between 1.24 $\mu$eV ($10^{-6}$ eV) and 1.24 meV ($10^{-3}$ eV), where h≈4.136 feV-s ($10^{-15}$ eV-s)≈6.626×$10^{-34}$ J-s is Planck's constant, $\hbar=h/2\pi$ is Dirac's constant, and $\omega$ is angular frequency. Note that units m is meters, Hz is hertz (cycles-per-second), eV is electron-volts, J is joules, s is seconds, and prefixes P, T, G, M, k, m, $\mu$, n, p, f and a correspond respectively to peta ($10^{15}$), tera ($10^{12}$), giga ($10^9$), mega ($10^6$), kilo ($10^3$), milli ($10^{-3}$), micro ($10^{-6}$), nano ($10^{-9}$), pico ($10^{-12}$), femto ($10^{-15}$) and atto ($10^{-18}$).

Humans lack natural ability to detect the presence of such radiation. By contrast, human eyes have sensitivity in the visible light portion of the electromagnetic spectrum. This visible portion ranges in wavelength from 0.75 $\mu$m (red) to 0.38 $\mu$m (violet), which corresponds to frequencies between 400 THz and 790 THz, expressible as energies between 1.7 eV and 3.3 eV. Consequently, to enable visible detection of HPM radiation would entail raising received photon energy by between three (3) and six (6) orders of magnitude.

Many types of luminescence are defined by the mechanism used to excite a luminescent material to induce radiation emission. Examples of luminescence include photoluminescence (photon absorption), radioluminescence (ionizing radiation), chemiluminescence (chemical reaction), and electroluminescence (electronic current). An artificial luminescent material or "phosphor" can be produced from generally powdered ceramic semiconductors with a crystalline material structure subtly altered by the introduction of dopant materials.

Photoluminescence constitutes a physical process that alters the wavelength (or "color") of electromagnetic radiation. In the process of photoluminescence, electromagnetic radiation strikes a material that absorbs the incident energy (thereby elevating an electron in a ground state to a higher discretized energy shell) and re-releases that energy in the form electromagnetic radiation of a different wavelength (as the energized electron transitions to a lower discretized energy shell). Change to a longer wavelength (at lower energy) is called Stokes emission or down-conversion; and change to a shorter wavelength (at higher energy) is called anti-Stokes emission or up-conversion.

Conventional phosphors have been designed that can down-convert visible light into near-infrared, night-vision compatible radiation or near-infrared light to mid-infrared thermal-vision compatible radiation. Conventional phosphors have been designed that can up-convert near-infrared radiation into visible light, or red-orange color into green-blue color, or visible light into ultraviolet radiation in a wavelength band about 0.2 $\mu$m.

To produce the up-conversion effect and satisfy conservation of energy, up-conversion phosphors require multiple low-energy, long-wavelength photons to produce a single higher-energy, shorter-wavelength photon. Two-photon processes are common, and there are phosphors that can use three low energy photons to produce a single higher energy photon. The photonic nature of the up-conversion process imposes limits on the up-conversion wavelength change. The ratio of the wavelength of incident electromagnetic radiation to the wavelength of emitted electromagnetic radiation in up-converting phosphors is typically between 1.5 and 3.5.

SUMMARY

While the diversity of microwave systems has lead to a variety of novel, useful technologies, there remains an inability to directly relate microwave radiation parameters to optically visible responses. Further, while an ability to directly relate microwave radiation parameters to optically visible responses is desirable, it is further desirable for such an ability to be possible without requiring on-board or remote power supply. As microwave systems have highly diverse wavelengths, and typically cover macroscopic areas, an optically visible response would preferably be amenable to large area coverage, and to operate across different microwave radiation sub-bands. Some applications of microwave systems are designed to operate at low power, and other microwave systems are designed to transmit over very macroscopic distances. Optically visible response should preferably occur at conventionally unavailable low incident microwave power levels. Microwave and Radio Frequency (RF) systems have become an integral part of the American warfighting capability. As microwave and RF technology has advanced, high power microwave (HPM) systems have been developed and/or fielded. Significant shortfalls in HPM test and evaluation (T&E) capability exist for conventional systems. Existing T&E systems are too large and heavy, too expensive, and have limited instrumentation functionality.

Conventional HPM radiation detectors yield disadvantages addressed by various exemplary embodiments of the present invention. In particular, various exemplary embodiments provide an indicator device for detecting HPM radiation. The HPM indicator includes an electrically-insulating substrate; an electrically-conductive portion disposed on the substrate; and an electroluminescence material disposed on the portion. The electroluminescence material can be zinc-cadmium-sulfide ((ZnCd)S) crystal doped with manganese (Mn) and aluminum (Al) as (ZnCd)S:$Mn^{2+}$,$Al^{3+}$, zinc sulfide (ZnS) crystal doped with manganese (Mn) as ZnS:$Mn^{2+}$, calcium sulfide (CaS) doped with europium (Eu) as CaS:$Eu^{2+}$, or strontium aluminate ($SrAl_2O_4$) doped with europium and dysprosium as ($SrAl_2O_4$):$Eu^{2+}$,$Dy^{3+}$.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 8 is a tabular view of comparative energies; and

DETAILED DESCRIPTION

Figure 1A:
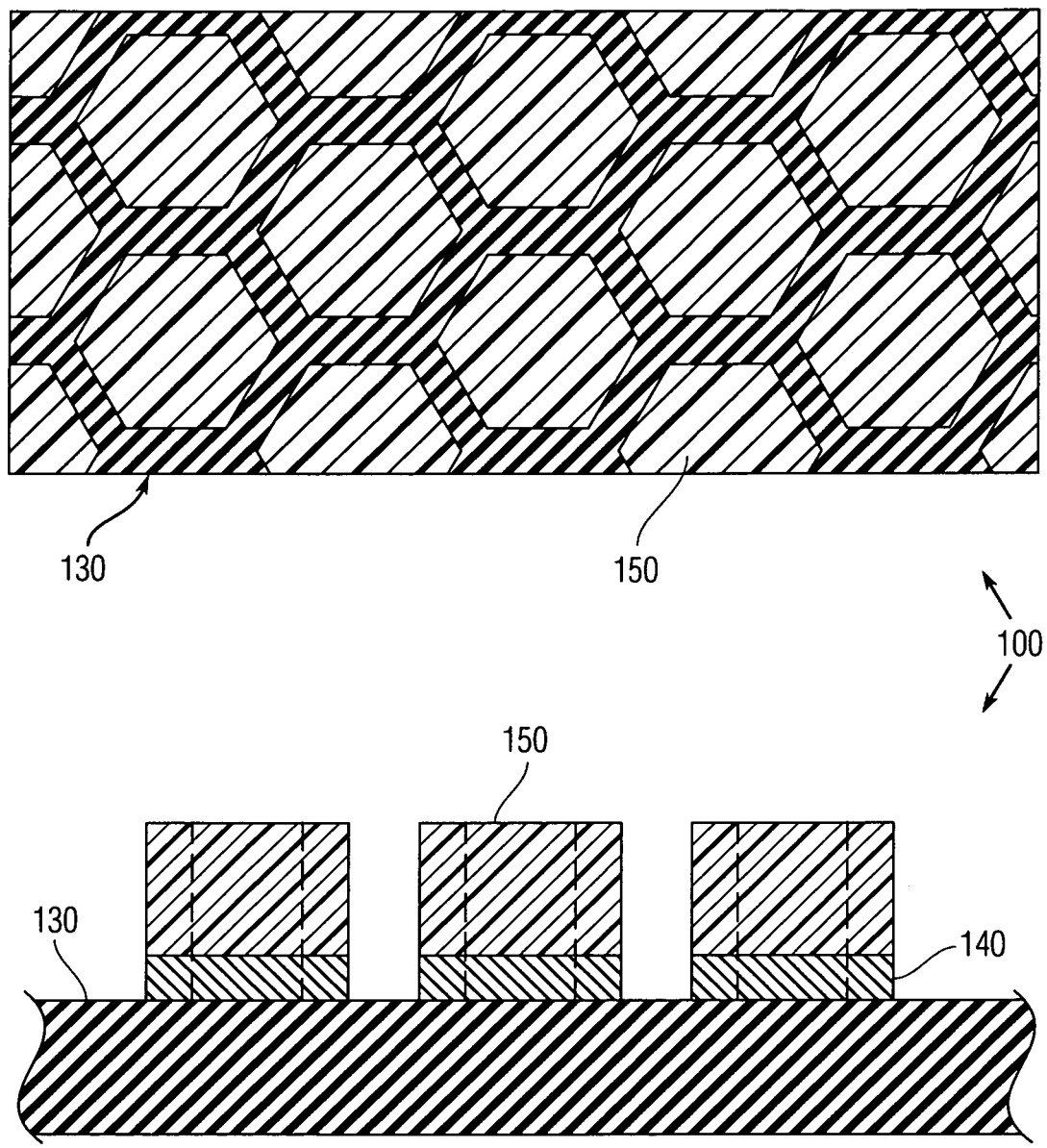
FIGS. 1A through 1C are plan and elevation views of a exemplary fabrication configurations of an RF detector.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments provide for a high-power microwave (HPM) detector by sensation of an electric field. Such an HPM detector can be employed as an HPM target board for testing with HPM systems. Such a board can facilitate in the design, test and evaluation, and operational use of HPM systems. Additionally, such a detector can be deployed for military operations to detect microwave illumination, such as by enemy forces for weapons targeting. Moreover, such a detector can be used for high-electrical field conditions, such as space probes used in the inner solar system.

Naval Surface Warfare Center (NSWC) Dahlgren has developed a novel method of visible luminescence induced by Microwave/RF illumination. The conversion of long wavelength microwave and RF radiation into short wavelength visible light has posed a significant technical challenge. The wavelength ratio of incident light to emitted light, $\lambda_{incident}:\lambda_{emitted}$ denotes a useful figure of merit to quantify the wavelength conversion capability of a luminescent material or process. Typical photonic up-conversion luminescence has a maximum $\lambda_{incident}:\lambda_{emitted}$ ratio of approximately three. NSWC Dahlgren has demonstrated a blended semiconductor/metal material that emits visible light when illuminated by microwave radiation, with a demonstrated $\lambda_{incident}:\lambda_{emitted}$ ratio of approximately 187-thousand. Further, this material was completely passive in operation, and required no external power source.

The exemplary blended semiconductor/metal material incorporates "phosphors" as the luminescent material. Phosphors are synthetically produced crystalline powdered semiconductors that have been modified to include a trace quantity of rare earth elements. The trace quantities of rare earth elements modify the host semiconductor's band gap structure to permit electron excitation from the valence band into higher energy states. As the excited electrons in higher energy states de-excite back into their ground states, these electrons cause photons to be released in the visible wavelength.

Various exemplary embodiments rely on the electroluminescence process to generate visible luminescence from microwave radiation. Electroluminescence occurs when a free electron interacts with an electroluminescent phosphor crystal. The kinetic energy of the free electron transfers to an electron in the phosphor crystal's outermost shell, causing to the phosphor's outer electron "jump" higher in energy state. As the excited electron de-excites lower to its "ground" energy state, the electron emits a photon, producing electroluminescence. Depending on the material and its quantum state energies, this emitted photon has a specific energy.

Various exemplary embodiments employ an electrical conductor and an electroluminescent phosphor. The conductor acts as the source of the free electrons to excite the phosphor, such as preferably gold (Au), silver (Ag) or copper (Cu). The phosphor electroluminescent commercial phosphors that require the least free electron kinetic energy for luminescent excitation are grouped together as vacuum fluorescent device (VFD) phosphors. Zinc-cadmium-sulfide ((ZnCd)S) represents one primary VFD phosphor. The host crystal of (ZnCd)S is then p-doped with trace quantities of impurities, typically rare earth elements such as manganese (Mn) and conductors such as aluminum (Al) as $(ZnCd)S:Mn^{2+},Al^{3+}$.

The rare earth dopants alter the band gap between valence and conduction electronic energy bands, and the conductor dopants act to decrease the kinetic energy of free electrons required to generate luminescence. This crystal has advantages in electroluminescent for multiple reasons. In particular, the ratio of zinc to cadmium in the (ZnCd)S crystal influences the color of the phosphor luminescence. As cadmium concentrations increase from small values, the color of the phosphor emission shifts from green to red. This color shift is independent of the free electron kinetic energy required for luminescent emission.

Other phosphors that can be applied in various exemplary embodiments include zinc sulfide (ZnS) crystal doped with manganese (Mn) as $ZnS:Mn^{2+}$, calcium sulfide (CaS) doped with europium (Eu) as $CaS:Eu^{2+}$, strontium aluminate $(SrAl_2O_4)$ doped with europium and dysprosium as $(SrAl_2O_4):Eu^{2+},Dy^{3+}$. The demonstrated ratio for various exemplary embodiments is approximately 178-thousand (or five orders of magnitude), thereby distinguishing these from conventional photonic up-conversion techniques.

Figure 1B:
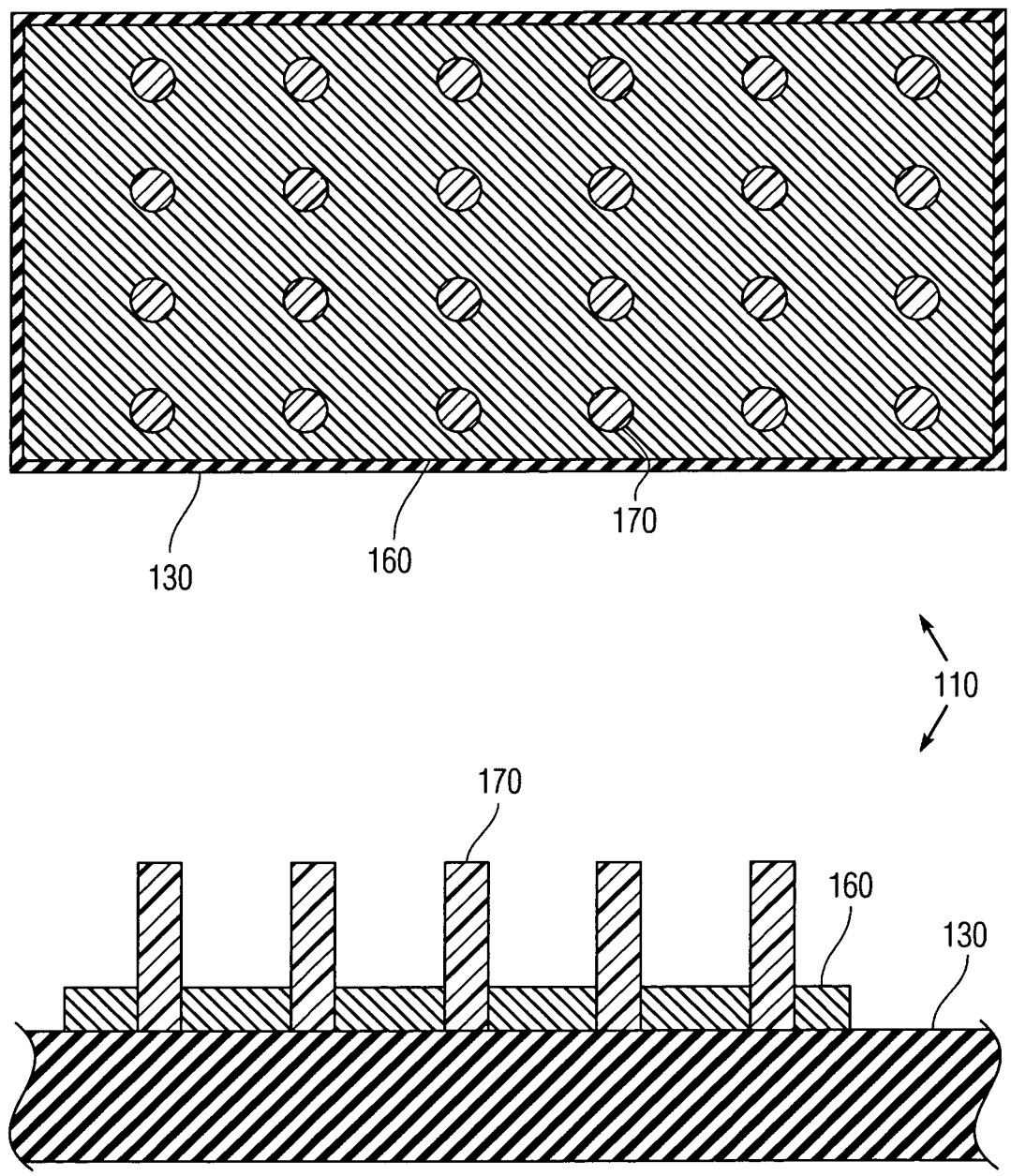
Figure 1C:
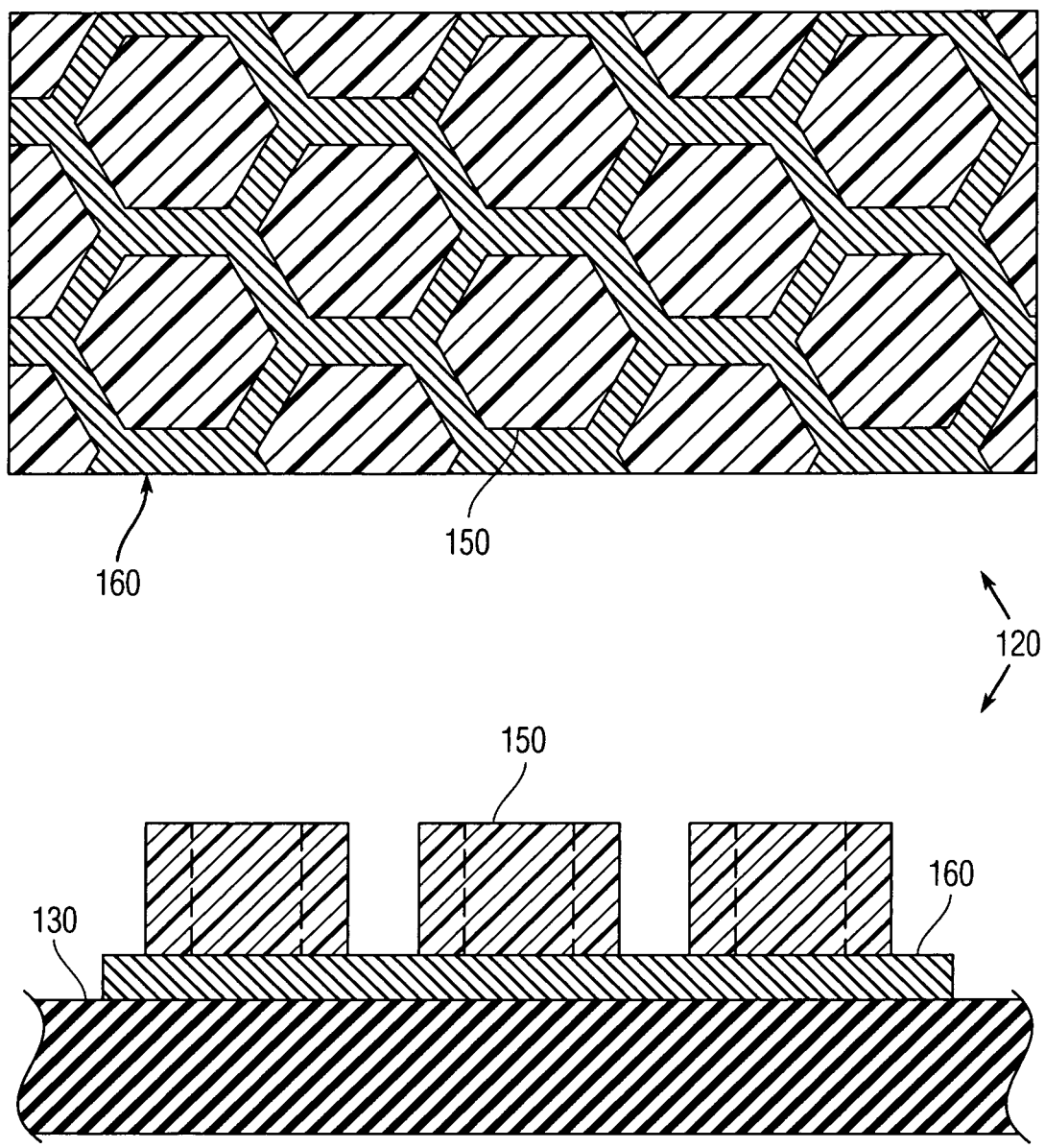

FIGS. 1A, 1B and 1C show respective plan and elevation views 100, 110 and 120 of representative configurations for an electroluminescence device (ELD) or isolated components thereof to be fabricated. The drawings are not to scale, and the geometries depicted are exemplary only. The specific examples for the wafer configurations are to increase sensitivity (i.e., to produce luminescence) at lower microwave power levels. The wafer configurations depicted in FIGS. 1A, 1B and 1C have been designed to be compatible with microfabrication wafer-production processes to produce a microwave-induced-luminescence surface/device that would precisely control the physical sizes and structures of the combined phosphor/conductor/insulator. Additionally, these surfaces/devices were designed with the purpose of increased sensitivity.

In the first view 100 of FIG. 1A, a portion of an insulating substrate 130 provides a base on which to deposit a mezzanine layer of conductive material (e.g., silver or Au) and superposed by an outer layer of phosphor material. These layers are etched together to produce isolated hexagonal coupon islands having a conductive component 140 and a phosphor component 150 that can subsequently be removed from the substrate 130. The conductive layer can be applied using Silva Solution® from TriMedica, which incorporates microscopic silver (argentum metallicum) suspended in water, combined in an epoxy to produce an RF conductive paint with a thickness of 12.5 μm.

In FIG. 1A, phosphor structures are connected to the insulator base by a layer of conductive material. The layer of conductive material is physically constrained to the being "under" the phosphor structures. Further, each of the phosphor structures and conductive layers are physically and electrically separated from one another. In view 100, electrons excited by the incident microwave radiation would flow in the conductive layer, and each conductive layer would be responsible for exciting its "own" phosphor structure. Further, view 100 also shows that the distance between phosphor structures can be small relative to the dimensions of the phosphor structures.

In the second view 110 of FIG. 1B, the insulating substrate 130 provides a base for the conductive mezzanine layer 160 superposed by the phosphor outer layer, which is etched to form small interconnected phosphor islands or structures 170. In view 110, these phosphor structures 170 are deposited directly on to the insulator base 130. The thin conductive layer 160 is disposed atop the insulator base 130, except where the phosphor structures 170 are deposited on top of the insulator base 130. In view 110, excited electrons flow continuously through the entire conductive layer 160, but the region of interaction between phosphor structure 170 and the conductive layer 160 is limited to the circumference of the phosphor structures 170 regarding electron migration.

In the third view 120 of FIG. 1C, the insulating substrate 130 provides a base for the conductive mezzanine layer 160 superposed by the phosphor outer layer, which is etched to form interconnected hexagonal islands. In view 120, the phosphor structures 150 are connected to the insulator base 130 by a layer of conductive material 160 deposited evenly across the entire insulator base 130. The phosphor structures 150 are deposited on top of the thin conductive layer 160, with the distance between phosphor structures 150 being small relative to the dimensions of the phosphor structures 150. In view 120, excited electrons flow continuously throughout the base 130, and the region of interaction between phosphor structures 150 and the electrons from the conductive layer 150 can encompass the entire base 130 of the phosphor structures 150.

Figure 2:
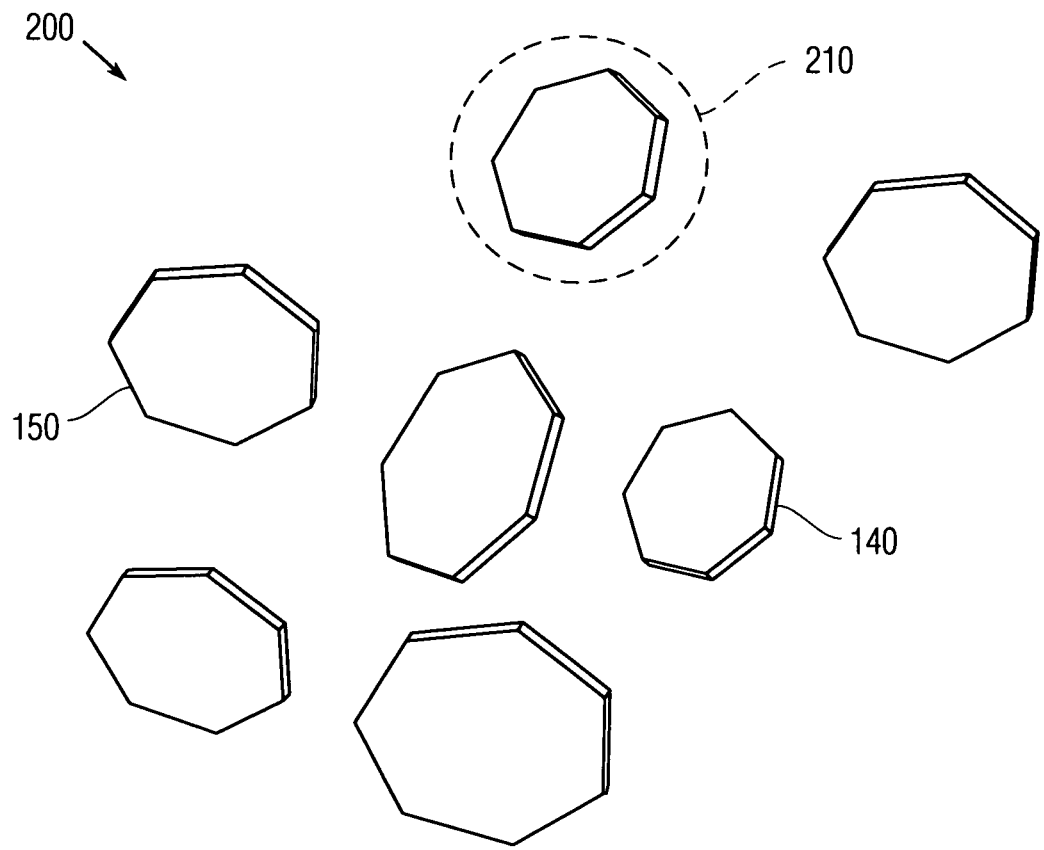
FIG. 2 is an isometric view of a plurality of detector hexagonal coupons.

FIG. 2 shows an isometric view 200 of hexagonal coupons 210 separated from the base 130. Each coupon 210 or "grain" includes the phosphor portion 150 and the conductive portion 140. These separate coupons 210 can be disposed on a board or other surface to represent a detection target for HPM radiation. Depending on sensitivity, the coupons 210 can optionally be electrically connected together at their conductive portions 140 in series or in parallel. The coupons 210 can vary in size across from hundreds of nanometers to hundreds of micrometers.

An exemplary design employs a rectifying antenna or "rectenna" for wireless power transmission. Rectennas directly convert microwave energy into DC electricity and can be optimized for low power microwave/RF wavelengths. Rectennas are commonly used as the receiving component of RFID systems. As the rectenna is capable of harvesting RF energy and producing DC electricity at power levels many orders of magnitude below HPM systems, electroluminescence could be produced for a variety of applications. In the described embodiment, rectennas have surface areas that are micromachined or micro-fabricated for patterning with the phosphor/conductor matrix described herein. These modified surface area produces visible light under RF illumination.

The proposed combination of rectenna and electroluminescence RF detector would differ from the earlier proposed luminescent HPM detectors in the key area of operational bandwidth. As the rectenna can be used to provide the energized free electrons required for electroluminescence, the low power rectenna/electroluminescent RF detector may be limited to use in the operational bandwidth of the rectenna. To generate response over a large bandwidth, an array of rectennas across the predicted incident RF frequencies is proposed.

Figure 3:
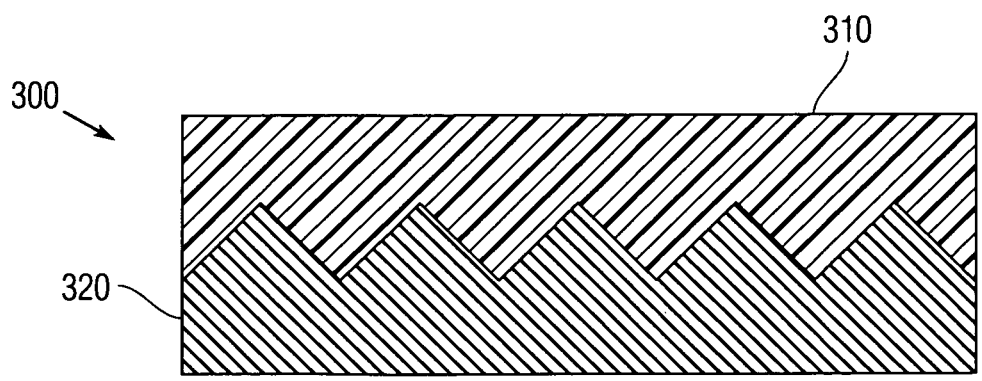
FIG. 3 is an elevation cross-section view of an RF detector.

FIG. 3 exhibits a cross-sectional view 300 of a configuration that enables detection at various electromagnetic wavelengths. A phosphor layer 310 and a conductor layer 320 interface by a saw-tooth pattern, thereby providing continuously variable gap distances for an electron to migrate through the conductor and locally energize the phosphor.

Figure 4:
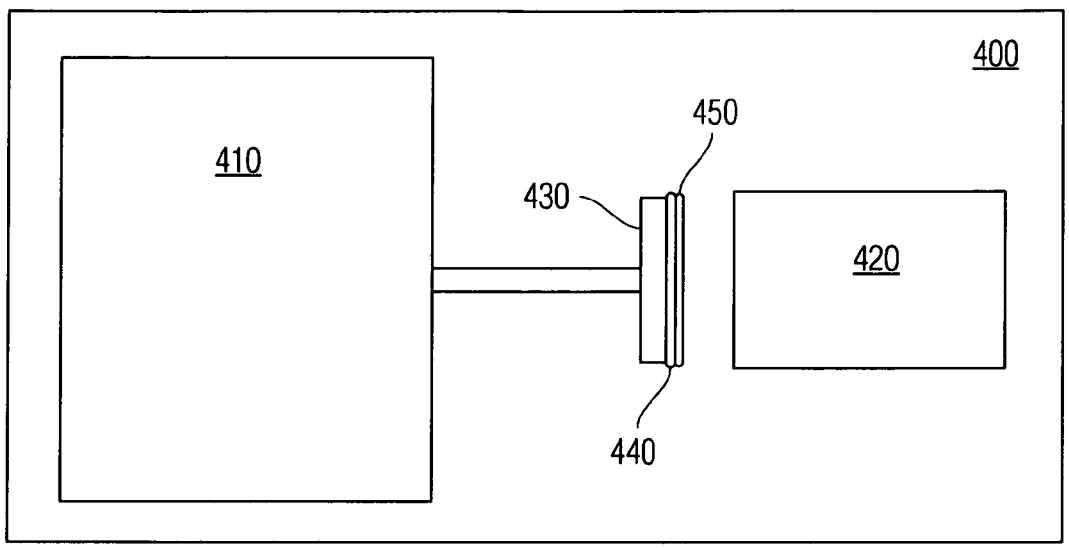
FIG. 4 is a block diagram view of an RF detection system.

FIG. 4 shows a block diagram view 400 of an exemplary active RF detection system. A thermoelectric cooler 410 and a photodetector 420. The cooler 410 supports a cooled detector head 430 along with its associated rectenna 440 and electroluminescent phosphor 450. An exemplary cooling head 430 can measure 2 mm×2 mm. An induced HPM emission produces an electric field that causes electrons to migrate from the conductor to the phosphor 450, thereby producing an illumination flash to be sensed by the photodetector 420.

Figure 5:
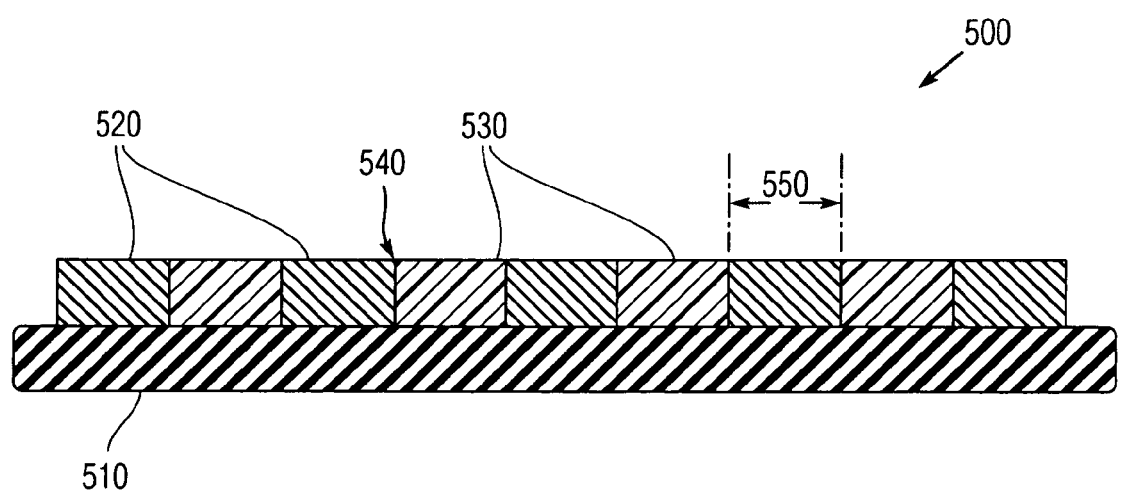
FIG. 5 is an elevation cross-section view of an RF detector.

FIG. 5 shows a simplified cross-section view 500 of an insulating substrate 510, with adjacent co-planar portions of conductor 520 and phosphor 530 joined at an interface 540. In this configuration, a free electron within the metal conductor 520 migrates in response to an electric field (e.g., induced by the HPM emission). For a lateral shift of the electron sufficient to reach the interface 540, the phosphor 530 emits a photon, thereby providing a detectable signal to indicate presence of the HPM. The conductor has a minimum distance or length corresponding to an electron path distance 550, and can range from hundreds of nanometers to several micrometers. The minimum distance refers to the minimum thickness of the layered conductor required to accelerate the electrons to energies sufficient to induce luminescence.

Figure 6:
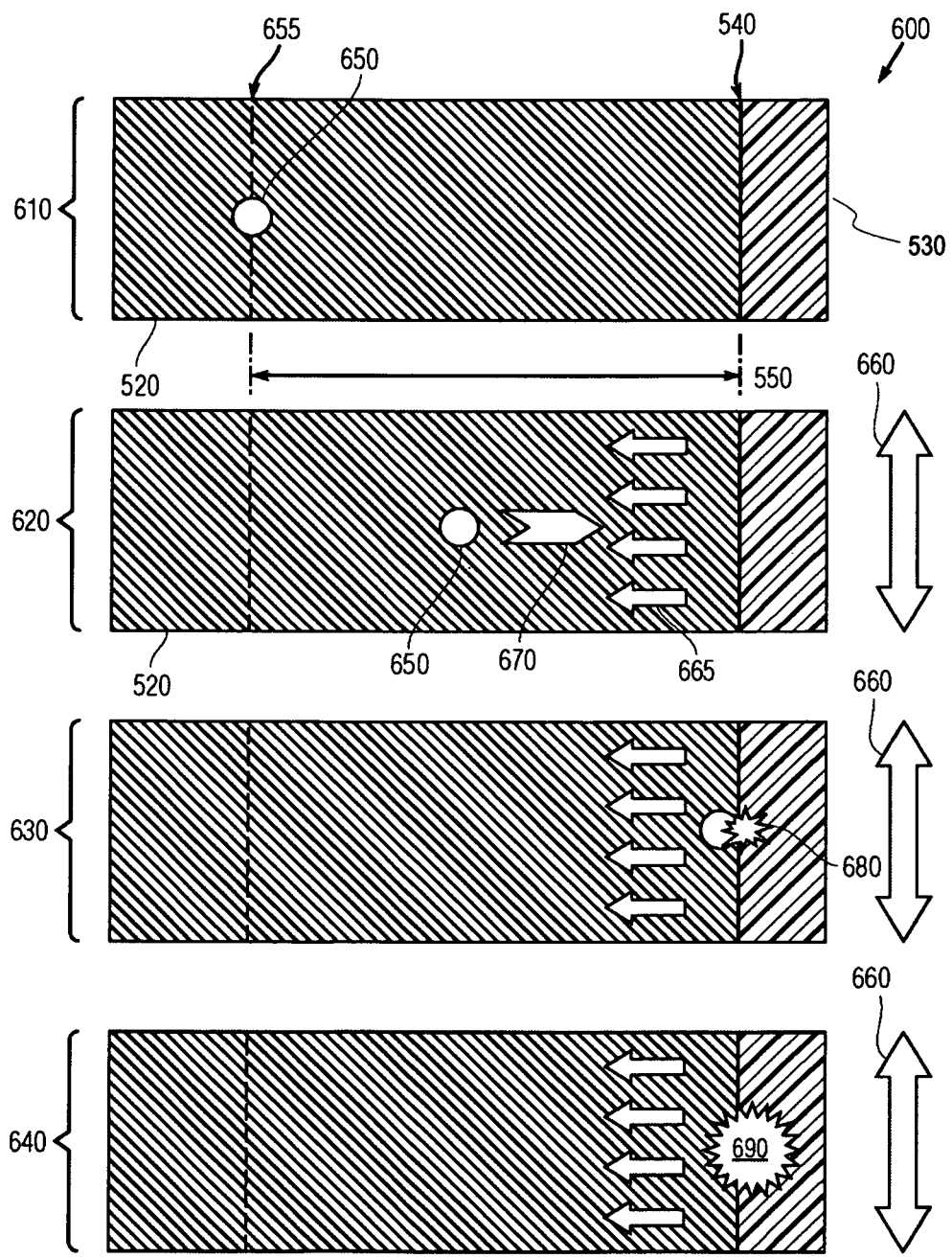
FIG. 6 is a series of elevation cross-section views of HPM effect to induce photon emission.

In conjunction with the cross-section view 500, FIG. 6 presents an illustration 600 of electric field's effect in a series of cross-sectional views 610, 620, 630 and 640. In the first view 610, the conductor portion 520 is disposed adjacent a partially shown phosphor portion 530. A free electron 650 within the conductor 520 is disposed at a position 655 corresponding to the distance 550 from the interface 540. No electric field is present within the first view 610. In the second view 620, emitted RF propagation energy 660 induces a transverse electric field 665, accelerating the electron 650 to translate in a direction 670 towards the interface 540. In the third view 630, the electron 650 reaches the interface 540 with energy gain of dV, where d is the distance 550 and V is the voltage of the field. Energy transfers from the electron 650 to the phosphor 530 causing an energy kick 680 for outer shell electron to ascend to a higher level. In the fourth view 640, the phosphor's outer electron cascades to a lower level, emitting a photon that produces a detectable flash 690.

Figure 7:
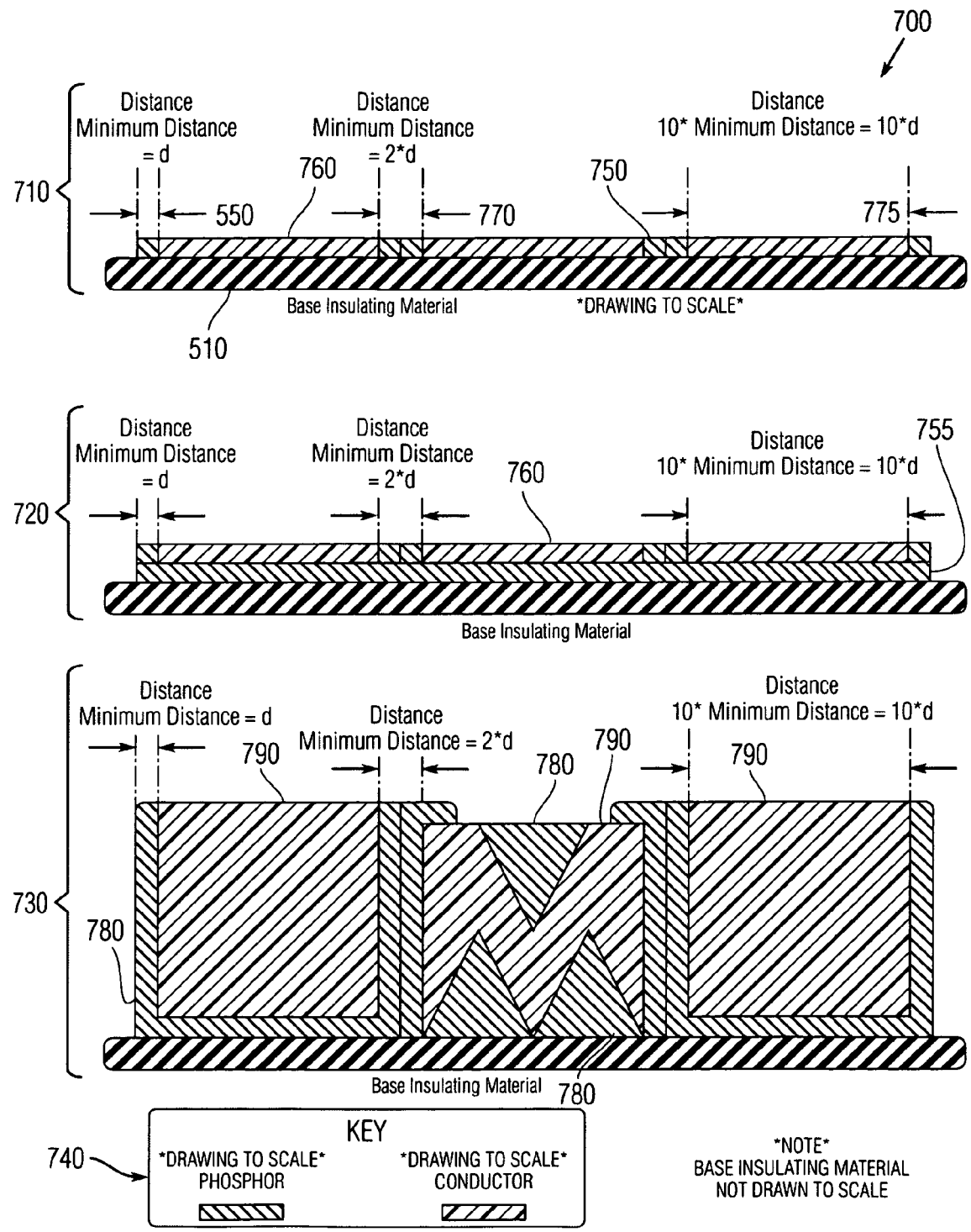
FIG. 7 is a series of elevation cross-section views of RF detectors.

FIG. 7 shows an illustration 700 of several cross-section views 710, 720 and 730 of configurations comparable to the cross-section view 500. A legend 740 distinguishes phosphor from conductor material. In the first configuration view 710, conductor sections 750 are disposed on the insulating substrate 510. In the second configuration view 720, conductor sections 750 are disposed on a 755 conductor layer over the substrate 510. In both views 710 and 720, phosphor sections 760 are disposed between the conductor sections 750. The phosphor sections 760 are separated by the conductor width distance 770 of twice the minimum electron path distance 550 and have widths 775 multiples greater than the conductor width 770, for example by a factor of ten. In the third configuration view 730, a more complicated geometry emerges with conductor portions 780 and phosphor portions 790, including substantially vertically uniform and saw-tooth sections.

FIG. 8 shows a tabular view 800 of electron energies in relation to response parameters. Activation electron energy is shown in decreasing magnitude in electron volts (eV) and atto-Joules ($10^{-18}$ J). HPM has been designated as producing electromagnetic interference with peak radiated power of 100 MW or greater, corresponding to an electric-field strength of 100 kV/m. For this field strength, translation distance is shown in millimeters, effective acceleration potential is shown in volts and electron speed is shown in kilometers-per-millisecond. Energy values range from one electron volt (1 eV) to one kilo-electron volt (1 keV). Acceleration changes are proportional to electron energy changes, and changes in electron speed are proportional to the square root of electron energy changes.

Figure 9:
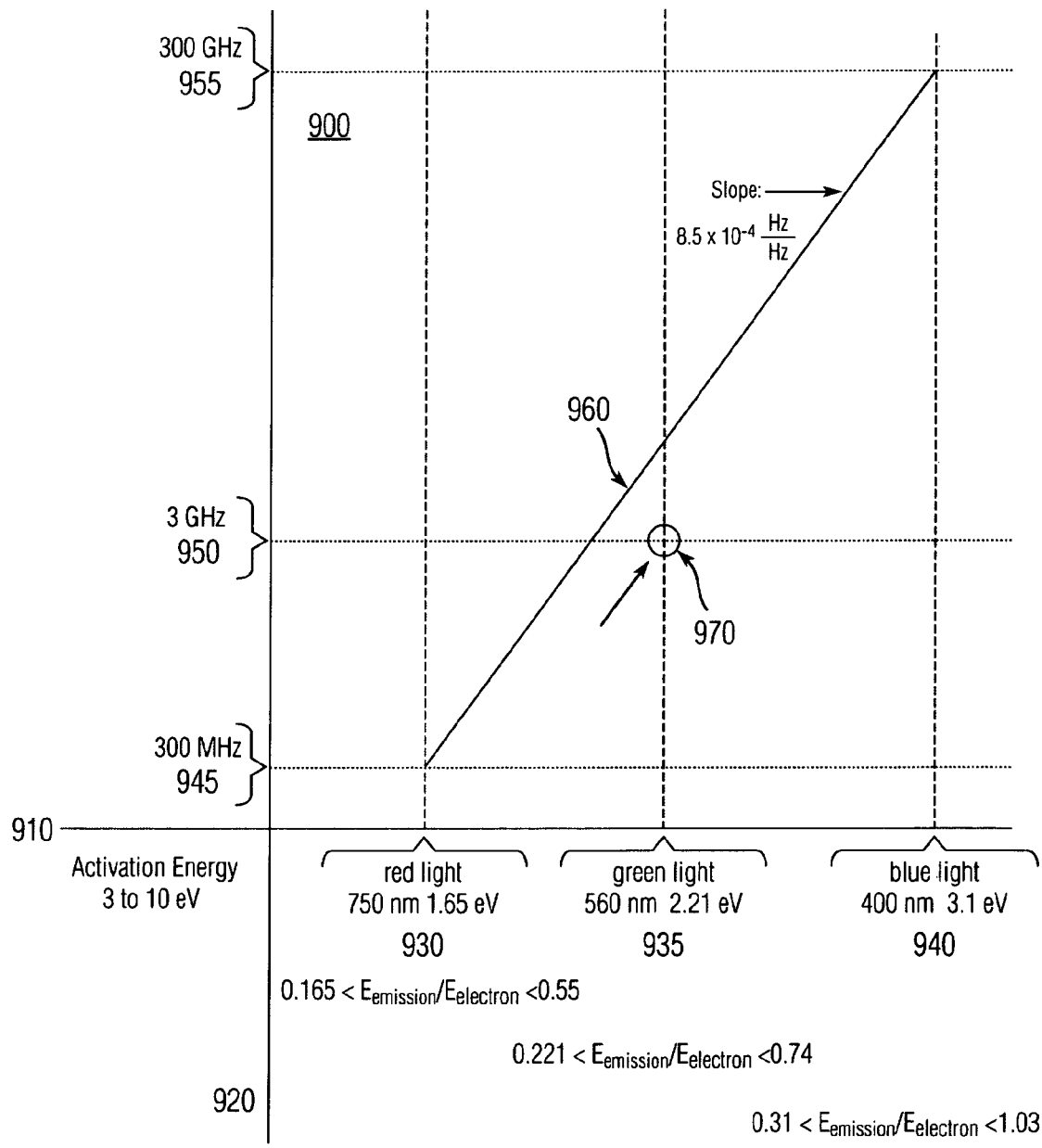
FIG. 9 is graphical view of comparative energies.

FIG. 9 shows a graphical view 900 of an electroluminescence phosphor quantified process. The abscissa 910 quantifies electromagnetic emission frequency in response to the ordinate 920 for phosphor activation energies. The response abscissa 910 ranges from low energy red light 930 of 0.40 PHz (wavelength 750 nm), mid-level energy green light 935 of 0.54 PHz (wavelength 560 nm), and high energy blue light 940 of 0.75 PHz (wavelength 400 nm), such that energy ratio between emission and electron would be about unity or less. The trigger ordinate 920 ranges from low level microwave 945 having frequency 300 MHz (wavelength of 1 m), mid level microwave having frequency of 3 GHz (wavelength of 10 cm) and high level microwave 955 having frequency 0.3 THz (wavelength of 1 mm). A log-log line 960 correlates the theoretical trigger-to-response slope of $8.5 \cdot 10^{-4}$ Hz/Hz with an empirical datum 970 showing a ratio of 187-thousand between the HPM and the emitted response. A legend 980 summarizes the operational conditions—microwave radiation incident on up-converting electroluminescent material; accelerate free electron by the induced electric field; collide the free electron into the luminescent crystal (i.e., phosphor), and finally if the electroluminescent activation energy (typically between 3 eV and 10 eV), energy transfers from the free electron to a phosphor electron, releasing an up-converting photon.

While the rectenna/electroluminescent RF detector can be a passive system similar to ongoing HPM luminescent work, the sensitivity of the detector can be increased by using an active, powered system. Research in micro electro-mechanical systems (MEMS) based thermoelectric cooling has produced devices with the ability to cool a 4 mm$^2$ (area) sized detector head to 80K, while consuming less than 270 mW of compressor input power, 9 mW of gross refrigeration, and 3 mW of net refrigeration, at a total unit volume of approximately 4 cm$^3$. The 80K temperature reached by the referenced thermoelectric cooler is within the 90K to 130K transition temperature required for superconductivity from the class of copper-oxide superconductors. A coolant head could then be micro-machined or micro-fabricated into a rectenna (or an array of rectennas) in the expected operational bandwidth. This would enable superconductors to be included in the phosphor-conductor matrix. The incorporation of superconductors would facilitate free electrons to more easily accelerate to the kinetic energy of excitation required by the phosphor, increasing detector sensitivity to less powerful RF.

To clarify material characteristics, a phosphor constitutes a synthetically fabricated semiconductor material with a regular, chemically defined crystalline structure considered the host material, which is frequently ceramic in characteristics, to which other materials are added, typically in trace (<10%) quantities, for the purpose of modifying the band-gap structure of the host material by introducing new, permitted electron states in the host crystal's band-gap, in a manner that permits photon-emitting electron transitions stimulated by external energy transfer into the host crystal's electron shell, typically for the purposes of observation of the photonic emission. During synthetic fabrication of phosphors, the long-range (greater than several atomic components up to thin film single crystals of physically macroscopic size) crystal structure of the host has its electronic structure modified in a congruent long-range fashion by the use of modern micro- and nano-manufacturing techniques to add dopants (i.e., trace materials) to the host crystal.

A phosphor, as defined by the scientific community, is an inorganic crystalline material composed of a host insulating or semiconducting material to which an impurity is introduced as a dopant. Phosphors are considered a subset of luminescent materials, such as bioluminescent insects and naturally occurring minerals. The dopant added to the host crystal introduces meta-stable states between the conduction and valence band, thereby narrowing the band gap and better permitting light producing transitions. Consequently, phosphors are materials that, when excited, emit non-thermally induced or "cold" light.

Luminescence can be generated by first exciting the electrons of the dopant within the phosphor materials to a higher energy state. As the electrons descend to the ground state, they emit at least one photon, generating luminescence. Note that a material is not required to be a phosphor to be luminescent, as any material with a band gap structure that permits photonic deexcitation will luminesce.

In scientific practice and in commercial fabrication, the dopant can be introduced in the lattice either an "interstitial" or a "replacement" geometry. Interstitial dopants occupy physical locations in the crystal between existing host crystal elements. Replacement dopants are applied to a host crystal by removing a trace percentage of the existing crystal structure and filling in the voids with the dopant.

The energy transfer that occurs when an electron de-excites from its luminescent meta-state into its ground state is related to the spectrum of the luminescent emission photons. The meta-stable to ground state transition is the energy source of the photon. The by energy of the photon must be no greater than the energy difference between the ground state and the meta-stable state. Luminescent emission can be indicated by the meta-stable state electronic shell position, with an arrow pointing to electronic shell transitions from ground state to the excited state, e.g., for europium (a lanthanide element) $^5D_0 \rightarrow {}^7F_2$, in which the left-superscript refers to the valance shell level, the letter denotes the subshell geometry and the right-subscript identifies the electron position in the shell.

Luminescence can be categorized by duration: prompt luminescence, fluorescence, and non-persistent luminescence. This classification was initially designated to include phosphor emission that, for human sight, appears to vary instantly in response to variations in excitation source.

Persistent luminescence can also be termed afterglow luminescence, glow-in-the-dark luminescence, phosphorescence, or long-lasting phosphorescence. In particular, luminescence resulting from a direct transition of less than approximately ten milliseconds (<~10 ms) decay time is frequently referred to in scientific literature as fluorescence, while luminescence of greater than ten milliseconds (>10 ms) decay time is known as phosphorescence. The greater decay time of phosphorescence is due to the existence of intermediate, meta-stable states. Recent conventional efforts have tended to design and apply dopants for extending the decay time, and thereby improve the stabilities of the phosphor's meta-stable luminescent centers.

There exist permitted electronic states with variable durations of stability, which affect the duration of time that an excited electron can exist in the state. The physical location of a meta-stable state in a host crystal can be described as a luminescent center. The length of duration of time that the electron can remain in the meta-stable state has been frequently observed to increase or decrease with the amount of time required for the luminescent centers in the phosphor to be filled to high capacity. The amount of time required for the number of luminescent centers in a phosphor crystal to fill to high capacity corresponds to the "rise time" of the phosphor. The rise time of a phosphor has observed to decrease with increases in the rate of electron excitation from low-energy electrons, e.g., "ground state electrons" to energized electrons occupying the meta-stable states at the luminescent centers.

The rate of electron excitation is defined by the coupling of the excitation source energy into the meta-stable state of the phosphor crystal's luminescent center, where it energizes available ground state electrons into the meta-stable states, and thus rise time and maximum achievable brightness for a given excitation source is approximately equal to the rate of excitation source energy coupling into the ground state electrons of the phosphor.

The brightness of the phosphor is equivalent to the instantaneously observable rate of photonic emission by the phosphor. The brightness varies in time, decaying to a percentage of its initial value that is commonly expressed as the "decay time" of the phosphor. The decay time has also been observed to and has been observed to be approximately directly proportional to the brightness of the phosphor. The phosphor will increase in the brightness of its luminescent emission from a minimum of zero (0) emitted photons to a maximum number of photons emitted, which is the maximum observable brightness of the phosphor.

For a given phosphor with a specific valance band, conduction band, and dopant created, enhanced, or other-wise modified meta-stable state that exists between the valance and conduction bands of the host crystal, there will be an optimum excitation mechanism with an optimum excitation duration for a maximum observable phosphor brightness, which is equivalent to a maximum rate of release of observable photons from the phosphor crystal.

The meta-stable state and luminescent duration: The valence and conduction band states of the host crystal are very stable, while the meta-stable states created by the addition of dopants are less stable. The measure of electronic stability of a state is the amount of time that an electron can remain in the state. The meta-stable state represents a shell level that the electron must be excited into. As such, there must be a mechanism to transfer the electron into the meta-stable state.

The valence and conduction band states of the host crystal are very stable, while the meta-stable states created by the addition of dopants are less stable. The measure of electronic stability of a state is the amount of time that an electron can remain in that state. The most stable states that have been produced in a synthetic phosphor are able to have electrons remain excited in the phosphor for approximately one megasecond (1 Ms, nearly 12 days), while the least stable electronic states that have been produced in a synthetic phosphor are able to have electrons remain excited in the phosphor for approximately nanoseconds. The most direct method to determine the "stability duration" of a phosphor involves energizing the phosphor with an excitation source that is standardized and calibrated in terms of power/brightness, time, and other characteristics dependant on luminescent mechanism. The phosphor is then excited by the standardized, calibrated source for one exposure.

The time duration of the exposure is determined by the amount of time required to bring the phosphor to a certain percentage of filled meta-stable luminescent states. However, there may be intermediate, temporary states that an excited electron must pass-through to "arrive" at the meta-stable luminescent state from its ground state, and also that there may be multiple ground states that have possible paths from the ground state to the meta-stable luminescent state, including electronic states in the valence band, in the conduction band, and in the band gap. This has important implications for luminescence modeling.

Emission spectrum: As phosphors luminesce, the photons that they emit can be narrow-band, broad-band, or broad- and narrow-band in frequency. In narrow-band frequency photonic emission, the emitted photons are of very similar frequencies, and thus, energies, and a plot of frequency versus number of emissions has sharp discrete peaks. In broad-band emission, the emitted photons have wide range of possible frequencies/energies, and a plot frequency versus number of emissions denotes a low wide curve.

Luminescence modeling remains a challenging effort. If the method of luminescence is from a single ground state directly into a single meta-stable state, then the modeling effort is usually very straightforward. However, if multiple ground states exist, or if there exist intermediate states between the ground state and meta-stable luminescent state, then the modeling effort is more complicated.

Electroluminescence has several definitions, including luminescence caused by "insert citations" regarding microwave induced electroluminescence generated by unbound (i.e., free) electrons striking the phosphor crystal. When a free electron physically strikes a phosphor crystal, if absorbed (rather than scattered), the electron can transfer its kinetic energy to the phosphor crystal. That energy can couple to and "energize" phosphor crystal electrons, transitioning them into an excited state. When the excited phosphor crystal electrons relax from their meta-stable excited state back to their ground, "de-energized" state, they can release photons. Such excitation involves response to fluctuations in an electric field that results from HPM radiation.

Applications of electroluminescence all must support a mechanism for "fast" free electrons with associated "high" kinetic energies to strike, or "become incident upon" the electroluminescent phosphor crystal. The "minimum electroluminescent energy" is the minimum kinetic energy that an electron must have to excite an electroluminescent phosphor crystal electron into its meta-stable, luminescent state. In typical, pre-existing commercial applications of electroluminescence, current is provided from an external source and passed through the phosphor.

In an electroluminescence device (ELD), the top electrode and bottom electrodes are metals that release phosphors when a differential charge, or electric potential, is applied, release electrons. In an alternating current (AC) ELD the electric potential varies in direction across the device, while in a direct current (DC) ELD, one material remains the cathode, or electron emitter, and the other is the anode. Although convention typically shows movement of positive charge away from the anode towards the phosphor cathode, the only physical particles in motion are electrons from cathode to anode.

A microwave beam generator operating at a fixed frequency, equivalently can be described as a flow of microwave wavelength photons that vary in power. Variation in microwave beam power represents the rate of change of energy. If a flow of microwave photons passes through a fixed, given area, the power of the microwave beam equals the number of photons that pass through the fixed, given area in a specified amount of time. The number of photons that pass through the fixed given area in a specified amount of time can then be considered the photon flux, which obeys conventional physical principles of area density.

Conductors, by definition, are sources of free electrons, and exist in many commercially available embodiments. Electroluminescent phosphors, in commercial form, typically exist as powders with crystal dimensions on the order of micrometers to tenths-of-millimeters. If conductors can be integrated with electroluminescent phosphors in a manner that permits incident microwave radiation to accelerate conductor free electrons to a speed that provide kinetic energies to the free electrons that are greater than the previously defined minimum electroluminescent energy, then phosphor crystal luminescent centers within physical proximity of the energized free electrons can emit visible light.

From June 2011 to November 2011, tests have been conducted Maginot Open Area Test Site (MOATS) at NSWC Dahlgren on a variety of prototype panels designed to emit visible light when illuminated by an HPM source. These panels have been found to emit characteristic visible luminescence when illuminated by the FNC-CIED/SERVAL HPM source.

Validation of Hypothesized Solution can be described. To validate this hypothesis, a powdered phosphor described in open-source literature as sensitive to electron impact excitation was applied to a thinly spread layer of commercially available conductive paint which was itself on an insulating substrate, forming a macroscopic two dimensional phosphor/conductor area. The insulating substrate with the applied two dimensional phosphor/conductor area was exposed to a microwave source.

When exposed to incident microwave illumination, the phosphor/conductor area would produce light with wavelength characteristic of the phosphor's electroluminescent emission. Further, the phosphor/conductor area emitted light was found to have brightness dependent upon incident microwave flux. The ratio of wavelength of incident microwave radiation to wavelength of emitted visible light was observationally determined to be approximately 187-thousand. The phosphor/conductor was therefore determined to be an "electroluminescent up-conversion" material.

Photoluminescent up-conversion phosphors depend on an individual photon's energy to excite phosphor electrons into luminescent sites, whereas electroluminescent up-conversion materials depend on a microwave beam's photonic flux, or equivalently, electric field flux, to excite phosphor electrons into luminescent sites. Electroluminescent up-conversion materials can fabricated in geometries that resemble powdered up-conversion photoluminescent phosphors. One can fabricate geometries of an electroluminescent phosphor or conductor that do not physically resemble, but functionally appear to operate, as powdered up-conversion photoluminescent phosphors. For an electroluminescent phosphor/conductor functionally appearing to operate as a powdered up-conversion photoluminescent phosphor, the electroluminescent phosphor must produce visible luminescence characteristic of the phosphor.

As is currently understood, the primary compositional difference between the "up-conversion photoluminescent phosphor" and the "electroluminescent up-conversion material" is the addition of conductors that are free electron laden within the electroluminescent up-conversion material.

This compositional difference implies that the electroluminescent up-conversion material can be expected to operate (i.e., generate electroluminescence) over what is currently assumed to be the majority, if not all, of the microwave spectrum. This provides electroluminescent up-conversion materials a wavelength-ratio of emitted-light-to-incident-light already observed to be at least 62-thousand times greater than that possible with up-conversion photoluminescent phosphors. Additionally, the primary dependence of luminescent brightness for an up-conversion photoluminescent powder involves the frequency of the incident light, while the primary dependence of luminescent brightness for an electroluminescent up-conversion material is the power of the incident light.

In operational testing, several properties of the luminescent HPM board were discovered:

(i) Luminescent brightness was found to be dependent upon incident HPM power level. As the power level was increased, the brightness of the emission was found to increase.

(ii) Luminescent brightness was also found to be dependent on HPM angle of incidence. Maximum brightness occurred when the HPM was incident normal to the luminescent HPM board, and minimal/no brightness occurred when the HPM was incident parallel to the luminescent HPM board.

(iii) The minimum electric field required for luminescent emission (for the versions tested to date) was experimentally determined to by 100 kV/m. Artisans of ordinary skill will recognize that this is an extremely large electric field, and that proposed further research into the HPM target board should be expected to decrease the required electric field strength.

(iv) The HPM target board was tested with HPM pulse durations of 1 µs to 4 µs. Brightness was found to increase with pulse duration. It is important to note that the literature value of the activation response time of the (ZnCd)S phosphor is 100 µs to 200 µs. Pulse durations of 1 µs may be close to the lower limit of the (ZnCd)S phosphor, and a different phosphor, with shorter activation response time may be necessary for luminescent emission with pulse durations shorter than 1 µs.

(v) The luminescent emission of the HPM target boards was in all cases daytime visible within a range of tens of meters.

(vi) The design of the second prototype HPM target board is compatible with large-area airbrush application. By mixing a high sensitivity phosphor of one color, and a lower sensitivity phosphor of a second color together on one HPM target board, it would be possible to distinguish power levels in the beam by the pattern and color of emission on the HPM target board.

The ultimate commercial potential of various exemplary embodiments will depend in large part upon the final minimum electric field required for luminescent emission. For the current second series prototype, the commercial potential is as a High Power Microwave target board for use in the directed energy ranges, laboratories and agencies of or available to the Department of Defense. The specific strategic goal of this topic is to increase the ability to detect and image HPM beams in real-time. With infrared lasers, operators can position an up-converting phosphor-impregnated card (or board) in the path of the laser beam, which glows to indicate the position of the beam. These cards are considered an essential part of infrared laser operations, and a luminescent HPM beam detector can serve in a similar capacity for HPM system testing.

As various ELD embodiments are engineered to become more sensitive to smaller electric fields, such ELDs could ultimately be used to detect and image a wide range of radio frequency electromagnetic emissions. The advantages and new features of the disclosed embodiments include:

(i) Affordability/Simplicity: Radio-frequency epoxy and other conductive sprayable solutions can be blended with powdered phosphor to create large-area HPM beam detectors for the cost of the conductive solutions and phosphor powder, both being available as commercial off-the-shelf (COTS) products.

(ii) Passive nature of operation. The demonstrated first and second series prototype HPM beam detectors require no external power for operation.

(iii) Safety. The target board increases safety by providing a visual indicator of high electric fields, and both the phosphor and conductive solutions used in this work pose little to no chemical, biological, or environmental hazards.

(iv) Broad-band response. Typical photoluminescent up-conversion and down-conversion are highly dependent upon the wavelength of the incident electromagnetic radiation. As exemplary embodiments depend on the magnitude of the electric field of the incident HPM beam for excitation, the up-conversion process can be used across a very broad range of microwave wavelength.

Alternatives to visible luminescence in observing microwave radiation is typically accomplished by electric field meters. These devices measure the maximum electric field of incident HPM radiation when used with oscilloscopes. In standard usage, a computer model can be generated of expected microwave beam pattern and field strength, which is then verified against measurements taken by electric field meters.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An indicator device for detecting high-power microwave radiation, comprising:
    an electrically-insulating substrate;
    an electrically-conductive portion disposed on said substrate; and
    an electroluminescence material disposed on said portion, said electroluminescence material including a semiconductor doped with a rare earth element, wherein the microwave radiation illuminates said electroluminescence material to respond by up-converting into visible radiation.

2. The device according to claim 1, wherein said conductive portion is at least one of gold (Au), silver (Ag) and copper (Cu).

3. The device according to claim 1, wherein said electroluminescence material is zinc-cadmium-sulfide ((ZnCd)S) crystal doped with manganese (Mn) and aluminum (Al) as $(ZnCd)S:Mn^{2+},Al^{3+}$.

4. The device according to claim 1, wherein said electroluminescence material is zinc sulfide (ZnS) crystal doped with manganese (Mn) as $ZnS:Mn^{2+}$.

5. The device according to claim 1, wherein said electroluminescence material is calcium sulfide (CaS) doped with europium (Eu) as $CaS:Eu^{2+}$.

6. The device according to claim 1, wherein said electroluminescence material is strontium aluminate ($SrAl_2O_4$) doped with europium and dysprosium as $(SrAl_2O_4):Eu^{2+},Dy^{3+}$.

7. An indicator device for detecting high-power microwave radiation, comprising:
    an electrically-insulating substrate;
    an electrically-conductive portion disposed on said substrate; and
    an electroluminescence material disposed on said portion, wherein
    the microwave radiation illuminates said electroluminescence material to respond by up-converting into visible radiation; and
    said electroluminescence material is taken from the group consisting of:
        zinc-cadmium-sulfide ((ZnCd)S) crystal doped with manganese (Mn) and aluminum (Al) as $(ZnCd)S:Mn^{2+},Al^{3+}$,
        zinc sulfide (ZnS) crystal doped with manganese (Mn) as $ZnS:Mn^{2+}$,
        calcium sulfide (CaS) doped with europium (Eu) as $CaS:Eu^{2+}$, and
        strontium aluminate ($SrAl_2O_4$) doped with europium and dysprosium as $(SrAl_2O_4):Eu^{2+},Dy^{3+}$.

8. The device according to claim 7, wherein said conductive portion is taken from the group consisting of gold (Au), silver (Ag), and copper (Cu).

* * * * *